US009883363B2

(12) United States Patent
Jeong

(10) Patent No.: US 9,883,363 B2
(45) Date of Patent: Jan. 30, 2018

(54) APPARATUS AND METHOD FOR PROCESSING CALL SERVICES IN MOBILE TERMINAL

(71) Applicant: Samsung Electronics Co., Ltd., Suwon-si, Gyeonggi-do (KR)

(72) Inventor: Jinhong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/042,989

(22) Filed: Feb. 12, 2016

(65) Prior Publication Data
US 2016/0165419 A1 Jun. 9, 2016

Related U.S. Application Data

(63) Continuation of application No. 13/741,986, filed on Jan. 15, 2013, now Pat. No. 9,264,869.

(30) Foreign Application Priority Data

Jan. 18, 2012 (KR) ........................ 10-2012-0005755

(51) Int. Cl.
*H04W 4/06* (2009.01)
*H04W 4/16* (2009.01)

(52) U.S. Cl.
CPC .................... *H04W 4/16* (2013.01)

(58) Field of Classification Search
CPC ..... H04W 4/16; H04W 84/045; H04W 76/02; H04W 12/06; H04W 12/08; H04W 48/16; H04W 84/22; H04W 8/005; H04W 4/005
See application file for complete search history.

(56) References Cited

U.S. PATENT DOCUMENTS

| 9,264,869 | B2* | 2/2016 | Jeong ...................... H04W 4/16 |
| 2003/0208352 | A1 | 11/2003 | Lee |
| 2006/0135137 | A1* | 6/2006 | Chung .................... H04M 1/27 |
| | | | 455/415 |
| 2008/0059605 | A1 | 3/2008 | Shalev et al. |
| 2009/0222313 | A1 | 9/2009 | Kannan et al. |
| 2009/0275365 | A1 | 11/2009 | Lee et al. |
| 2013/0033562 | A1* | 2/2013 | Naidu ................. H04L 12/2809 |
| | | | 348/14.02 |

(Continued)

FOREIGN PATENT DOCUMENTS

KR 10-2009-0114719 A 11/2009

OTHER PUBLICATIONS

Korean Office Action dated Sep. 12, 2017, issued in the Korean Application No. 10-2012-0005755 dated Jan. 18, 2012.

*Primary Examiner* — Diane Mizrahi
(74) *Attorney, Agent, or Firm* — Jefferson IP Law, LLP

(57) ABSTRACT

An apparatus and method for processing call services in a mobile terminal are provided. The method for processing call services in a mobile terminal includes entering into, when a call is generated, a call handling mode, recognizing and analyzing voice signals sent and received in the call to produce speech analysis information, detecting a state change of the mobile terminal using a sensing unit to produce user behavior information, and predicting, when a state change of the mobile terminal is detected, an application corresponding to the speech analysis information, and activating the application as a follow-up service.

11 Claims, 12 Drawing Sheets

(56) References Cited

U.S. PATENT DOCUMENTS

2013/0159007 A1    6/2013  Brosche et al.
2016/0165419 A1*   6/2016  Jeong .................... H04W 4/16
                                                    455/414.1

* cited by examiner

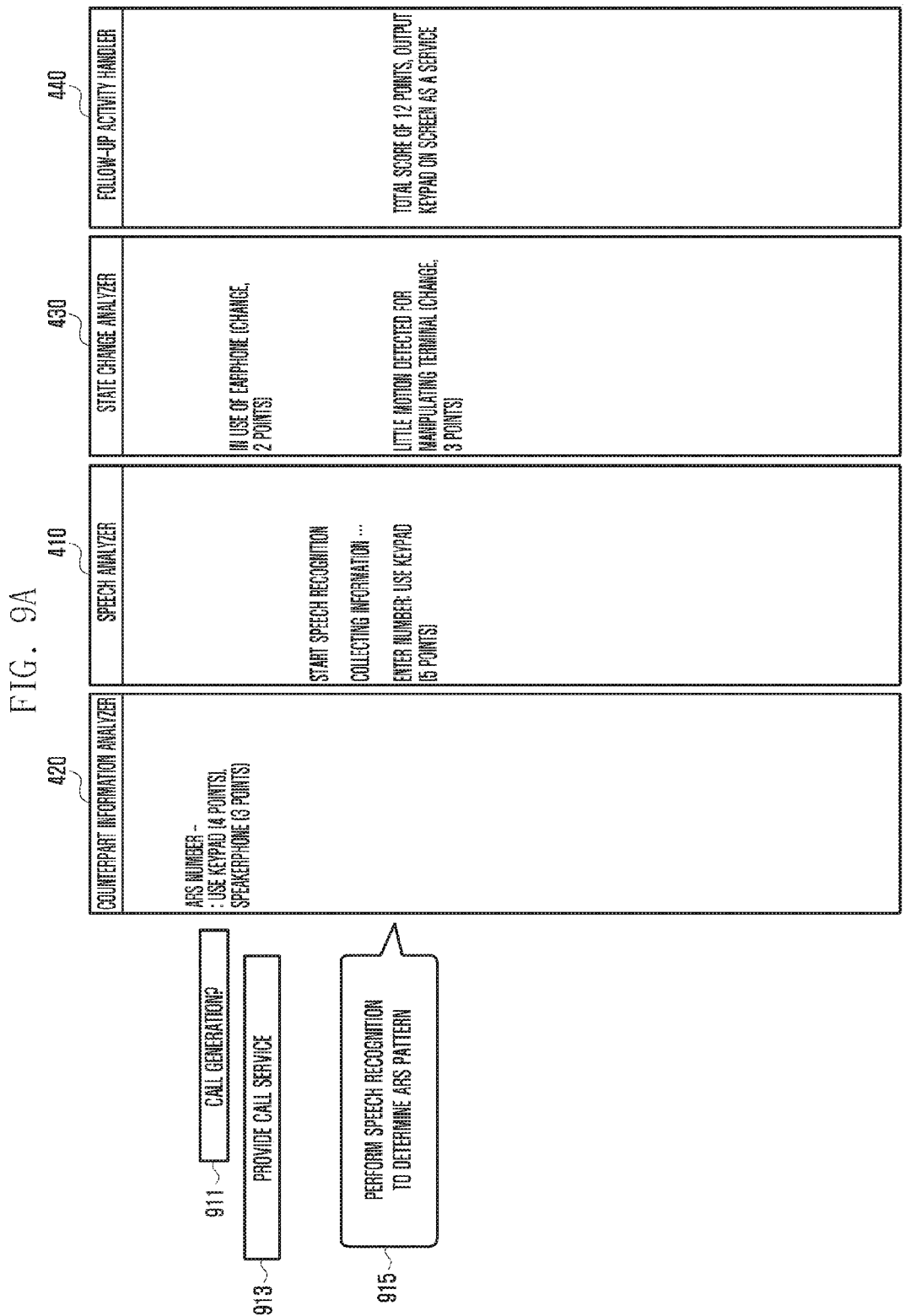

APPARATUS AND METHOD FOR PROCESSING CALL SERVICES IN MOBILE TERMINAL

CROSS-REFERENCE TO RELATED APPLICATION(S)

This application is a continuation application of prior application Ser. No. 13/741,986, filed on Jan. 15, 2013, which has issued as U.S. Pat. No. 9,264,869 on Feb. 16, 2016 and claimed the benefit under 35 U.S.C. § 119(a) of a Korean patent application filed on Jan. 18, 2012 in the Korean Intellectual Property Office and assigned Serial No. 10-2012-0005755, the entire disclosure of which is hereby incorporated by reference.

BACKGROUND OF THE INVENTION

1. Field of the Invention

The present invention relates to call service processing in a mobile terminal. More particularly, the present invention relates to a call service processing apparatus and method that can offer a follow-up action in advance during an ongoing call by analyzing the phone conversation in a mobile terminal.

2. Description of the Related Art

In addition to voice call handling, an advanced mobile terminal may perform various functions including speech recognition and multimedia processing. The mobile terminal may employ various sensors to control different functions. A mobile terminal may be controlled by verbal commands input through speech recognition. To save battery power and prevent malfunction, a mobile terminal equipped with a touchscreen may be controlled on the basis of sensing signals collected by various sensors so as to disable display and touch input functions while the mobile terminal is brought close to the ear during a call.

In some cases, during an ongoing call, the user of a mobile terminal may have to perform another action according to phone conversation information. For example, during an ongoing call, the user may have to check schedules and/or messages or enter keys to initiate a specific function. Having to perform a different action during a call may trouble the user and disrupt the phone conversation. However, existing mobile terminals provide only a limited function to handle this problem.

Hence, a need exists for a system and method that proposes a user action in advance during an ongoing call on the basis of phone conversation information, counterpart information and/or the state of the mobile terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention provides a call service processing apparatus and method that can offer a follow-up action in advance during an ongoing call in a mobile terminal by analysis of the phone conversation with the counterpart.

The present invention also provides a call service processing apparatus and method for a mobile terminal that propose a user action in advance during an ongoing call on the basis of phone conversation information, counterpart information and/or the state of the mobile terminal.

To achieve this, during an ongoing call in a mobile terminal, phone conversation information is analyzed through speech recognition and a follow-up action for the user is proposed in advance according to the analysis results. Here, the follow-up action may be proposed in consideration of information on the counterpart of the call and/or the current state of the mobile terminal in addition to speech recognition results.

In accordance with an exemplary embodiment of the present invention, a method for processing call services in a mobile terminal is provided. The method includes recognizing and analyzing voice signals sent and received in a call, displaying, when the voice signals exhibit an Automatic Route Selection (ARS) pattern, a keypad for entering alphanumeric information, and providing an ARS call service using information entered through the keypad.

In accordance with another exemplary embodiment of the present invention, an apparatus for processing call services in a mobile terminal is provided. The apparatus includes a communication unit for sending and receiving voice signals during a call, a sensing unit for sensing a state change of the mobile terminal, a control unit for recognizing, during a call, voice signals, producing speech analysis information on the basis of speech recognition results, predicting, when a state change of the mobile terminal is detected by the sensing unit, an application corresponding to the speech analysis information, and activating the application as a follow-up service, and a display unit for outputting the follow-up service.

In accordance with another exemplary embodiment of the present invention, a method for processing call services in a mobile terminal is provided. The method includes entering into, when a call is generated, a call handling mode, recognizing and analyzing voice signals sent and received in the call to produce speech analysis information, detecting a state change of the mobile terminal using a sensing unit to produce user behavior information, and predicting, when a state change of the mobile terminal is detected, an application corresponding to the speech analysis information, and activating the application as a follow-up service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 9A and 9B illustrate activation of a follow-up action in an Automatic Route Selection (ARS) call according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to an apparatus and method that can propose a follow-up action in advance during an ongoing call in a mobile terminal by identifying user needs. To achieve this, conversation information is collected through speech recognition during a call. Information on state or position changes of the mobile terminal is collected. The situation and the intention of the user are identified on the basis of the collected information. A follow-up action or activity is determined according to the identified situation and intention, and is presented to the user.

In an exemplary embodiment of the present invention, during a call, the phone conversation between the user and counterpart user is analyzed through speech and voice recognition, and a follow-up action or activity for the user is predicted on the basis of the analysis results and presented to the user. When the user changes the position of the mobile terminal during the call, this may indicate the intention of the user to perform an action other than conversation. Hence, one or more user actions may be effectively proposed in advance during an ongoing call on the basis of any of conversation analysis results, position changes of the mobile terminal, counterpart user information, and the like.

Figure 1:
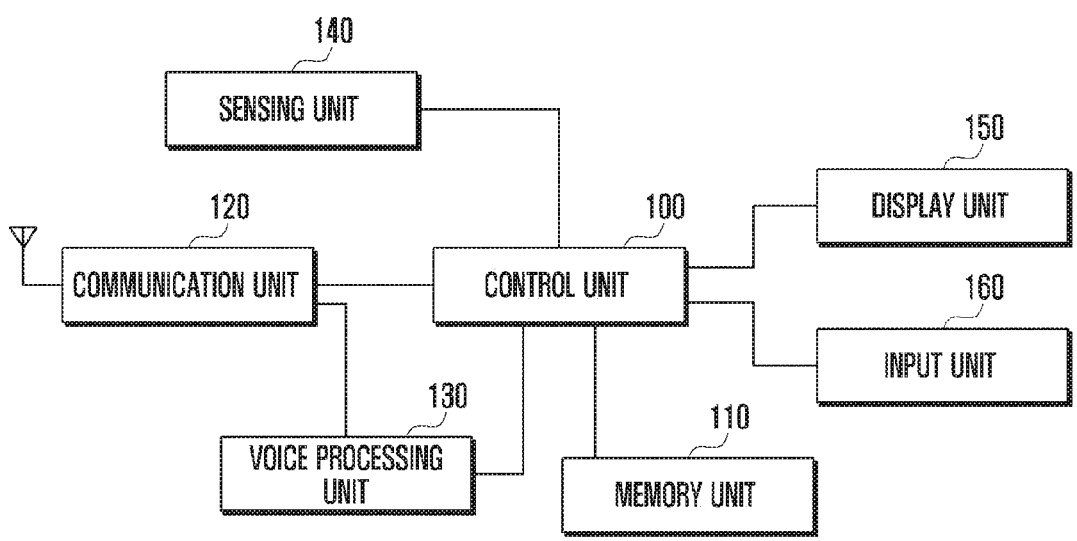
FIG. 1 is a block diagram of a mobile terminal according to an exemplary embodiment of the present invention.

FIG. 1 is a block diagram of a mobile terminal according to an exemplary embodiment of the present invention.

Referring to FIG. 1, a communication unit 120 of the mobile terminal performs wireless communication with a base station or another mobile terminal. The communication unit 120 may include a transmitter for up-converting the frequency of a signal to be transmitted and amplifying the signal, and a receiver for low-noise amplifying a received signal and down-converting the frequency of the received signal. The communication unit 120 may further include a modulator for modulating a signal to be transmitted and forwarding the modulated signal to the transmitter, and a demodulator for demodulating a signal received through the receiver. Modulation and demodulation may be conducted according to Long Term Evolution (LTE), Wideband Code-Division Multiple Access (WCDMA), Global System for Mobile Communications (GSM), Wi-Fi, Wireless Broadband (WiBro), Near Field Communication (NFC) or Bluetooth.

A control unit 100 controls the overall operation of the mobile terminal. More particularly, the control unit 100 may include a voice analyzer to analyze phone conversation information during a call, and may predict a follow-up action of the user and present the predicted follow-up action to the user during the call.

A memory unit 110 may include a program area to store programs for operating the mobile terminal and for realizing functions of the present invention, and a data area to store tables used for terminal operation and data generated during program execution. More particularly, the memory unit 110 may store a speech recognition table for call conversation analysis and recognition.

A voice processing unit 130 processes voice signals sent and received through the communication unit 120. A sensing unit 140 detects state changes of the mobile terminal caused by the behavior and movement of the user. The sensing unit 140 may include an ambient light sensor to sense illumination intensity and a camera module to capture images of external objects. The sensing unit 140 may further include an acceleration sensor, geomagnetic sensor and gyro sensor to sense the movement and posture of the mobile terminal.

A display unit 150 may include a Liquid Crystal Display (LCD) or Organic Light-Emitting Diode (OLED) panel to display data and images generated by programs under control of the control unit 100. An input unit 160 may include a touch panel that detects a touch gesture of the user and sends a corresponding touch signal to the control unit 100. The input unit 160 and the display unit 150 may be combined as a touchscreen.

In the mobile terminal having the above configuration, during a call, the control unit 100 applies speech recognition to voice signals processed by the voice processing unit 130 and analyzes the call conversation on the basis of the speech recognition results. The control unit 100 analyzes the call conversation to present a follow-up action or activity using a speech recognition table stored in the memory unit 110. More particularly, the call conversation is analyzed to extract information related to a schedule or time, phone number, location, person and the like. The extracted information is used to predict a follow-up activity. Here, a follow-up action or activity refers to a user function of the mobile terminal that may be invoked by the user in conversation with a counterpart user during a call. Examples of a follow-up action during a call may include schedule checking and planning, message browsing and viewing, recording, spam registration, and activation of the input unit.

Sometimes, during an ongoing call, the user of a mobile terminal may have to perform another action (e.g., schedule checking and planning, memo writing, phonebook searching, and the like) according to phone conversation information. In this case, the user is inconvenienced by having to suspend the conversation, perform a needed action or function, and then resume the conversation. Hence, it is preferable for the mobile terminal to analyze the phone conversation and to propose a needed action or function in advance.

In an exemplary embodiment, the control unit 100 includes a speech analyzer to recognize the conversation during a call. When preset information is detected in the conversation, the control unit 100 automatically activates a corresponding function during the call.

In recent years, speech recognition technology has been rapidly advanced. Beyond speech-to-text conversion or keyword recognition, speech recognition software may understand the context of a conversation much like a human being may understand. Exemplary embodiments of the present invention provide a necessary service to the user during a call through the use of speech recognition. Speech recognition may be performed at the mobile terminal using a proprietary solution or a third party solution, or performed through interworking between the mobile terminal and a server. In the following description, the control unit 100 is assumed to include a speech analyzer. The speech analyzer may present a follow-up action to be performed by the mobile terminal through speech recognition of the call conversation. The speech analyzer may use keyword recognition, context understanding and/or conversation pattern recognition.

The speech analyzer of the control unit 100 analyzes a phone conversation to identify the activity type and other key information related to the activity type. Here, examples of key information may include time information, number information, location information, personal information, and the like.

A speech recognition table summarizing speech recognition results is illustrated in Table 1. The speech recognition table illustrates various parameters used to derive a follow-up action in a phone conversation.

TABLE 1

| Example phrases | Activity type | Key information | Activity |
|---|---|---|---|
| Do you have time for lunch tomorrow? | Schedule | Time, day | Check schedule at lunch time tomorrow. When no appointment is present at that time, schedule an appointment with the counterpart. |
| Hello, this is AAA Telecom. Please enter a desired service number. If you want to discuss call quality . . . | Keypad | | Output a keypad. To maintain call connection in use of a keypad, increase volume of call or speakerphone. |
| Let me know the phone number of Kim BB? | Phonebook, text message | Personal information | Find phone number of Kim BB from phonebook, and help the user to send a text message. |
| Have you checked an email from BBB corporation? Please check emails! | Email | Personal information | Check email, find an email sent to or received from the counterpart, or find an email corresponding to personal information. |
| Hello? Who is this speaking? | Phonebook, search call history | | Find similar number in phonebook, check call list for phone number |
| Hello. This is YYY of XX credit card. Please allow me to introduce new services to you. | Spam registration | Phone number | Register caller number as spam |
| Hello. You won a prize in an event. Please enter registration number for identity confirmation? | Phishing alert, search the Web for the caller number | | Check security for the caller number, warn possibility of phishing |
| Darling, do you remember what day today is? | Schedule, check anniversary dates | Day or date | Search address book for anniversary date of the counterpart, check schedules |
| Hey, when is the anniversary of the death of ABC's father? | Schedule, check address book. | Personal information, event information | Provide information on persons |
| How are you? This is CCS. Long time no talk. How have you been? | Check address book, check Simple Notification Service (SNS) | Personal information | Provide information on persons so as to help management of personal connections |

TABLE 1-continued

| Example phrases | Activity type | Key information | Activity |
|---|---|---|---|
| Do you have a pen and some paper? Can you write a memo? | Memo, speakerphone, recording | Conversation | Switch to memo mode, increase volume of call or speakerphone |

In an exemplary embodiment, the user may issue a voice command to the mobile terminal during a call. In this case, the speech analyzer of the control unit 100 may fail to predict a follow-up action owing to multiple sources of sounds, e.g., a phone conversation and voice commands. Processing of a voice command may be separated from analysis and recognition of the phone conversation. A preset key may be used to notify a voice command during a call, and it is preferable not to transmit a voice command to the counterpart user. For example, during a call, when the user enters a preset key and pronounces "Galaxy, check schedules" as a voice command, the control unit 100 may block forwarding of the voice command to the communication unit 120 and perform a schedule checking function. When voice commands are used as above, a straightforward speech recognition table may be formed in the memory unit 110. Hence, when the user issues a voice command during a call, the control unit 100 may recognize the voice command and perform a corresponding function.

Figure 2:
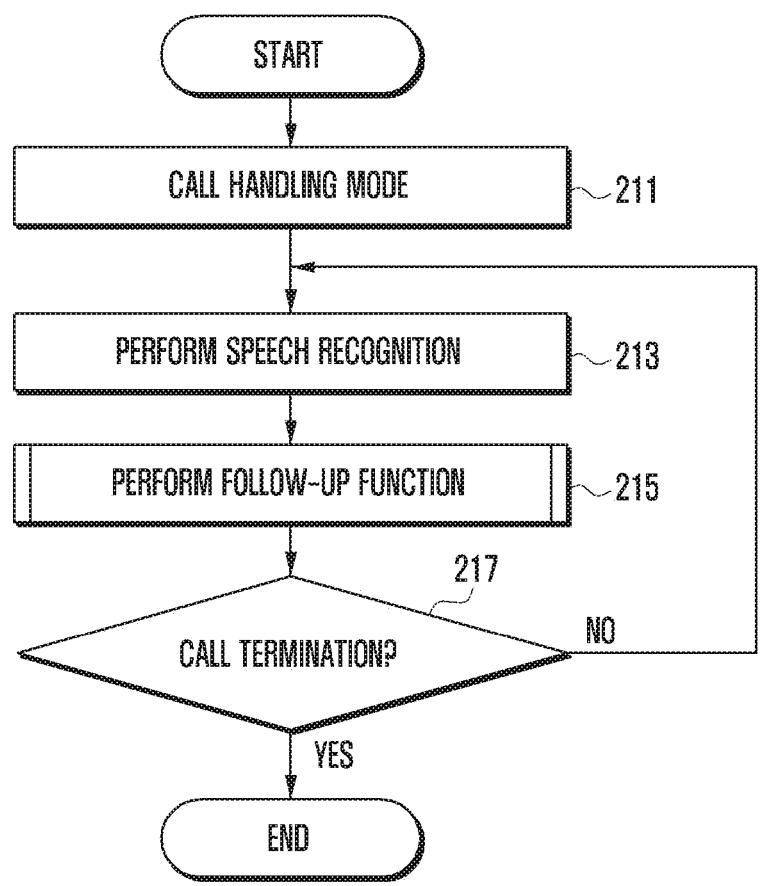
FIG. 2 is a flowchart of a method for suggesting follow-up actions through recognition of an ongoing conversation in a phone call according to another exemplary embodiment of the present invention.

FIG. 2 is a flowchart of a method for suggesting follow-up actions through recognition of an ongoing conversation in a phone call according to another exemplary embodiment of the present invention.

Referring to FIG. 2, when a call is placed by the user or a call is received from a counterpart user, the control unit 100 of the mobile terminal enters into a call handling mode at step 211. Here, a call connection is established through the communication unit 120 between the mobile terminal and the counterpart mobile terminal. The voice processing unit 130 processes voice signals sent and received through the communication unit 120. In the call handling mode, the control unit 100 performs speech recognition to analyze the phone conversation at step 213, determines a follow-up action on the basis of speech recognition results, and performs a corresponding function at step 215. At step 213, the control unit 100 may recognize the phone conversation between the user and counterpart user or a voice command from the user. At step 217, the control unit may determine whether the call has terminated. If the call has not terminated, the control unit may return to call handling mode and perform speech recognition.

Figure 3:
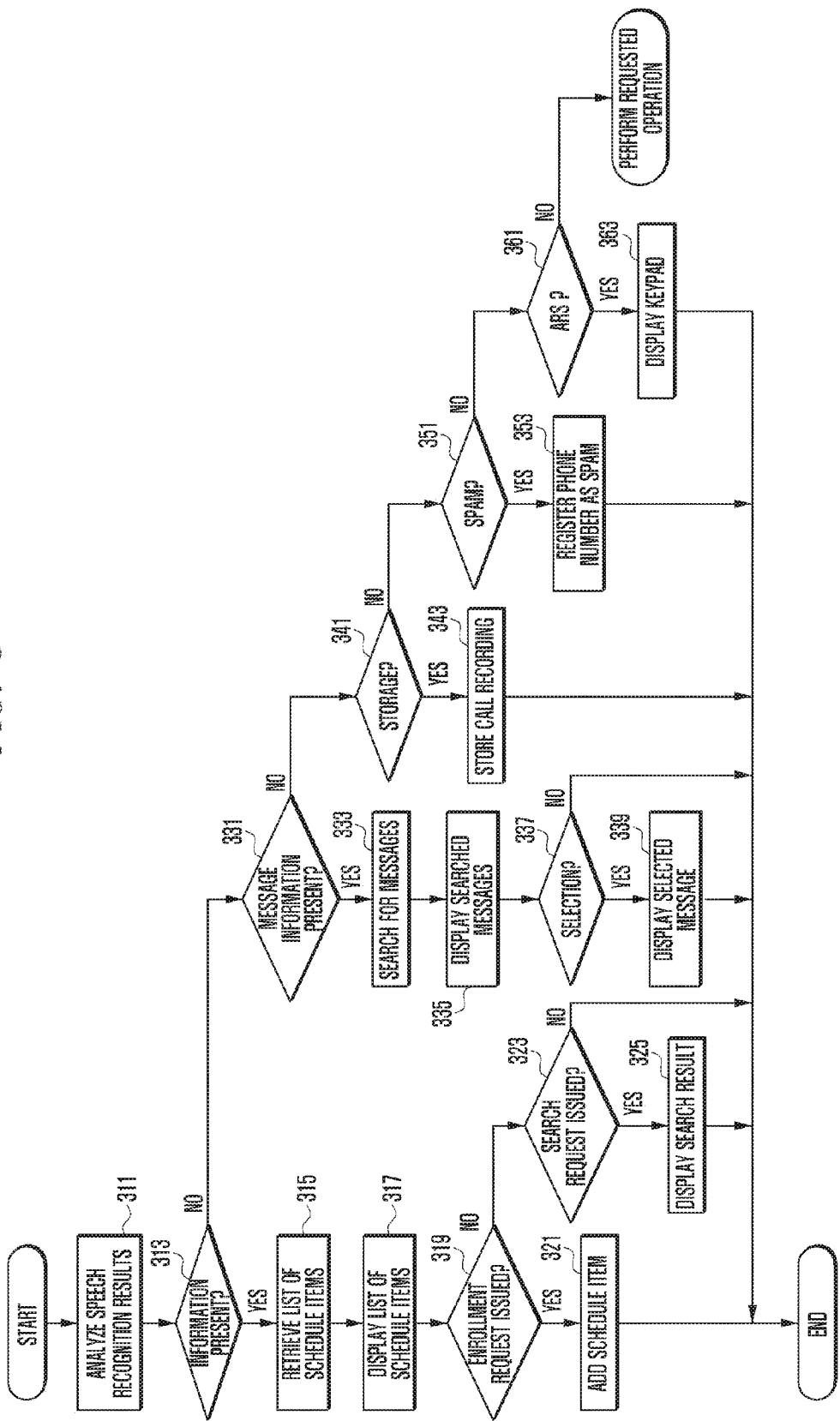
FIG. 3 is a flowchart of a procedure for suggesting a follow-up action on the basis of speech recognition results (or a voice command of the user) in a phone conversation according to an exemplary embodiment of the present invention.

Step 215 for presenting a follow-up action is described in FIG. 3.

FIG. 3 is a flowchart of a procedure for suggesting a follow-up action on the basis of speech recognition results (or a voice command of the user) in a phone conversation according to an exemplary embodiment of the present invention.

Referring to FIG. 3, the control unit 100 analyzes speech recognition results at step 311. Table 1 illustrates speech recognition results obtained by recognizing what the counterpart user says. Here, speech recognition results may include date information, message information, counterpart information (e.g., personal information, number information, and the like) location information, and the like. One or more pieces of such information may be recognized.

Here, date information may be given in an explicit form (numerical date) and/or in an implicit form like "today", "tomorrow", "yesterday", "lunch time", "evening", "AM", "PM" and the like. Personal information refers to information related to persons enrolled in a phonebook, and may include a user name, phone number, an email address, SNS information and the like. Location information may include a city name, region name, address, building name, road name and the like. Message information may include information related to a Short Message Service (SMS) message, Enhanced Message Service (EMS) message, Multimedia Messaging Service (MMS) message, SNS message, instant message and the like.

In the case where date information is present in the speech recognition results at step 313, the control unit 100 retrieves a list of schedule items stored in the memory unit 110 at step 315, and displays the list of schedule items at step 317. When an enrollment request is issued at step 319, the control unit 100 adds a schedule item containing the name of the counterpart user, and indicated time and location to the list at step 321. When a search request is issued at step 323, the control unit 100 searches the list for a schedule item associated with the date information and displays the search result at step 325. Here, the user may make a specific request through a touch gesture or through a voice command.

In the case where message information is present in the speech recognition results at step 331, the control unit 100 searches for messages at step 333. Here, as described before, messages may include an email message, an SMS message, an MIMS message, an SNS message, an instant message and the like. Messages may be searched using personal information or using both date information and personal information. The control unit 100 displays a list of searched messages on the display unit 150 at step 335. When one of the displayed messages is selected at step 337, the control unit 100 displays the selected message at step 339. Here, message selection may be achieved through a touch gesture or through a voice command.

In the case where key information requiring storage or recording is present in the speech recognition results at step 341, the control unit 100 may store the key information in the memory unit 110 or record the phone conversation and store the recording at step 343. This step may be invoked when certain words, such as "memo" or "record," are recognized in the conversation, when the counterpart user is associated with a previous call requiring storage or recording, when the conversation is related with a legal matter requiring recording and the like.

In the case where a spam pattern is present in the speech recognition results and the phone number of the counterpart user is not enrolled at step 351, the control unit 100 may regard the call as spam and may register the phone number and personal information of the counterpart user as spam at step 353. In the case where entry of a code number is requested and the phone number of the counterpart is in an Automatic Route Selection (ARS) number format at step 361, the control unit 100 regards the call as an ARS call and displays a keypad for entering a code number at step 363.

As described above, an exemplary mobile terminal of the present invention performs speech recognition of the conversation during a call, predicts a user action (follow-up activity) on the basis of speech recognition results, and executes a function supporting the predicted user action in advance. Hence, the user of the mobile terminal does not have to directly invoke a different function during a call and may pay more attention to the ongoing conversation.

To present more appropriate and versatile follow-up actions during a call, other types of information such as personal information related to the counterpart user and behavioral changes of the user in the phone conversation may be utilized in addition to speech recognition results.

Figure 4:
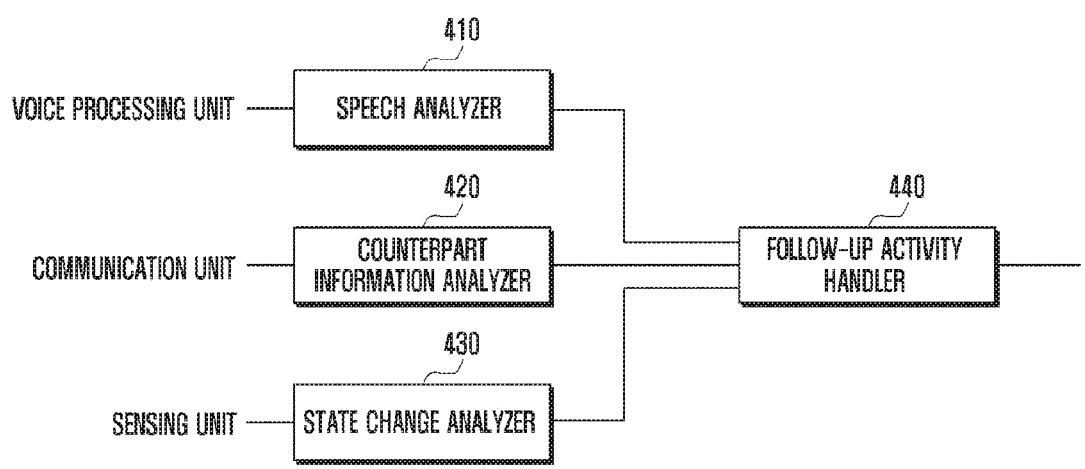
FIG. 4 illustrates a configuration of a control unit of the mobile terminal, which is designed to propose a follow-up action in a call on the basis of phone conversation information, counterpart information or user behavior according to an exemplary embodiment of the present invention.

FIG. 4 illustrates a configuration of the control unit of the mobile terminal, which is designed to propose a follow-up action in a call on the basis of phone conversation information, counterpart information and user behavior according to an exemplary embodiment of the present invention.

Referring to FIG. 4, a speech analyzer 410 identifies an activity that may be performed during a call on the basis of speech recognition results, and sends key information corresponding to the identified activity to a follow-up activity handler 440. When the user issues a voice command for a follow-up action during the call, the speech analyzer 410 may send key information corresponding to the voice command to the follow-up activity handler 440.

A counterpart information analyzer 420 collects information on the counterpart user of a call. For a counterpart user, information on the frequency of calls and activity type involved in the phone conversation may be collected. Collected counterpart information is sent to the follow-up activity handler 440.

A state change analyzer 430 collects information on posture and the state of the mobile terminal during a call. During a call, the mobile terminal may be placed close to the ear, a speakerphone may be used, or the mobile terminal may be moved because of user action. Such movement and state changes may be detected through sensors. Collected state change information is sent to the follow-up activity handler 440.

The follow-up activity handler 440 determines a follow-up action on the basis of information received from the speech analyzer 410, counterpart information analyzer 420 and state change analyzer 430, and presents the follow-up action in advance during the call.

In addition to the speech recognition table, the memory unit 110 may further store an action-state table for analyzing state changes of the mobile terminal due to user action, and a counterpart information table for analyzing information on a counterpart user of a call.

As described above, the speech analyzer 410 analyzes the conversation between the user and counterpart user during a call through speech recognition. The speech analyzer 410 may produce analysis results as illustrated in Table 1. The counterpart information analyzer 420 collects information on the counterpart user. Counterpart information may be obtained from signaling data from the base station, a phone number, and information attached to an email, an SNS, an instant message, and the like. Counterpart information may be obtained from the Internet through the communication unit 120. The state change analyzer 430 may collect information on state changes of the mobile terminal during a call through the sensing unit 140.

The follow-up activity handler 440 determines a follow-up action by combining analysis results from the speech analyzer 410, counterpart information analyzer 420 and state change analyzer 430, and presents the follow-up action in advance during the call. Here, each of the speech analyzer 410, counterpart information analyzer 420 and state change analyzer 430 may score the analysis results, and the follow-up activity handler 440 may determine a follow-up action using numerical scores.

The speech analyzer 410 may analyze the conversation, collect various information such as date information, personal information, location information, number information and event information, score the collected information items, and output the scored results to the follow-up activity handler 440. The speech analyzer 410 may utilize a speech recognition table illustrated in Table 1.

The counterpart information analyzer 420 may use the phone number of a counterpart user in a call to identify a probable action. For example, in an ARS call, the counterpart information analyzer 420 may identify the use of a keypad as a probable action. When a call with an unknown phone number is received, the counterpart information analyzer 420 may determine to search the call history for the phone number, search the phonebook for a similar phone number, or to search a black list for the phone number. When a received call is related to business (e.g., a call from a business partner), the counterpart information analyzer 420 may determine to find transaction documents, memos, email messages related to the corresponding company, and the like.

Table 2 illustrates a counterpart information table.

TABLE 2

| Counterpart | Probable action |
| --- | --- |
| ARS | Use of keypad, use of speakerphone, call recording |
| Enrolled user-business partner | Search emails, schedules, recordings, memos, or contact information (department, rank or the like) |
| Enrolled user-relative, friend | Search or transmit schedules, memos, contact information (birthday, anniversary or the like) |
| Unenrolled phone number | Find similar phone number, make memo, record or schedule, spam registration, heck call history, warn phishing |
| Enrolled user-legal issue (contract, lawsuit) | Recording, memo writing, schedule making |
| Enrolled user-user selection | Check user settings |

The state change analyzer 430 uses sensing signals from the sensing unit 140 to monitor the state of the mobile terminal and to identify a meaningful change in a user's behavior, which may indicate a probable follow-up action. In addition to the sensing unit 140, the state change analyzer 430 may identify a change in a user's behavior through external buttons and through the input unit 160. The state change analyzer 430 may identify a change in a user's behavior with reference to preset actions or movements.

Here, the actions may be preset gestures or natural actions of the user during a call. For example, a gesture of laterally shaking the mobile terminal two times may be preset as a request for a specific function; and the user may laterally shake the mobile terminal two times to invoke the function. In some cases, natural actions of the user during a phone conversation may be interpreted as a request for a specific function. For example, the user in phone conversation may move the mobile terminal from a position close to the ear to another position in front of the eyes in order to view some information item. The sensing unit 140 may detect a large change in illumination intensity (ambient light sensor), detect rotational movement and stoppage of the mobile terminal (acceleration sensor), detect a change in the position of the mobile terminal, and detect the face or eye of the user (camera module). Such changes in the position and state of the mobile terminal may indicate an intention of the user wishing to find some information during a call. As another example, when the user uses an earphone during phone conversation, the user may carry the mobile terminal in various ways. However, a user seldom holds a mobile terminal in front of their eyes during phone conversation. When the user places the mobile terminal in front of their eyes, rotational movement and stoppage of the mobile terminal may be detected and the state of the user may be identified through the camera module.

The state change analyzer 430 may identify state changes of the mobile terminal during a call using an action-state table illustrated in Table 3.

check whether the phone number of the call is enrolled in the mobile terminal. When the phone number is enrolled, the control unit 100 may check whether the counterpart user is, e.g., a relative, a friend, or a business partner. When the phone number is not enrolled, the control unit 100 may collect information on the phone number through an external network, like the Internet, or may check whether the phone number is an ARS number. After analyzing the counterpart user, the control unit 100 performs speech recognition to analyze the phone conversation and to extract information for probable follow-up activities at step 515. Here, the speech analyzer 410 collects information for probable follow-up activities during the call. The control unit 100

TABLE 3

| Scenario during call | Determination conditions | Scenario for service request | Determination conditions (change) |
|---|---|---|---|
| Talking with terminal close to the ear | light sensor: low light intensity movement sensor: little movement camera: Off | Placing mobile terminal before the eye for visual information | light sensor: high light intensity movement sensor: detect preset action (rotation with large motion) camera: detect face (eye) |
| | | Talking with terminal close to the ear, checking information with audio | light sensor: low light intensity movement sensor: detect preset action (e.g. shaking) button input: enabled (e.g. power button) |
| Talking with terminal detached from the ear- various postures are possible, but terminal is seldom in front of the face | light sensor: high light intensity movement sensor: little movement camera: On touch input: No | To check information, move terminal before the eye so that terminal is parallel with the face for visual information | movement sensor: detect preset action (stoppage or little motion, rotation with large motion, stoppage) camera: detect face (eye) touch gesture sensor: detect preset action (stoppage or little motion, rotation, stoppage at given angle) camera: detect face (eye) touch input: enabled button input: enabled (e.g.: power button, home button) |
| Talking with an earphone- various postures are possible, but terminal is seldom in front of the face | earphone: connected light sensor: On/Off movement sensor: little movement camera: On | To check information, move terminal before the eye so that terminal is parallel with the face for visual information | movement sensor: detect preset action (stoppage or little motion, large motion, stoppage) camera: detect face (eye) touch input: enabled button input: enabled (e.g.: power button, home button) |
| Talking through Bluetooth- in most cases, terminal is detached from the user | Bluetooth: connected light sensor: On/Off movement sensor: little movement camera: On | To check information, manipulate detached terminal | movement sensor: detect preset action (stoppage or little motion, large motion, stoppage) camera: detect face (eye) button input: enabled (e.g.: power button, home button) touch input: enabled |
| Talking while manipulating the screen | light sensor: high light intensity touch input: Yes movement sensor: stoppage touch input: No button input: No | Move terminal before the eye for visual information | movement sensor: detect preset action (e.g. shaking) button input: enabled |
| Using speakerphone with terminal placed at a fixed location | | To check information, manipulate terminal | movement sensor: detect preset action (e.g. jogging, shaking) camera: detect face (eye) touch input: enabled |
| An incoming call arrives | | Come to answer the call | touch input: enabled button input: enabled movement sensor: detect preset action camera: detect face (eye) |

Figure 5:
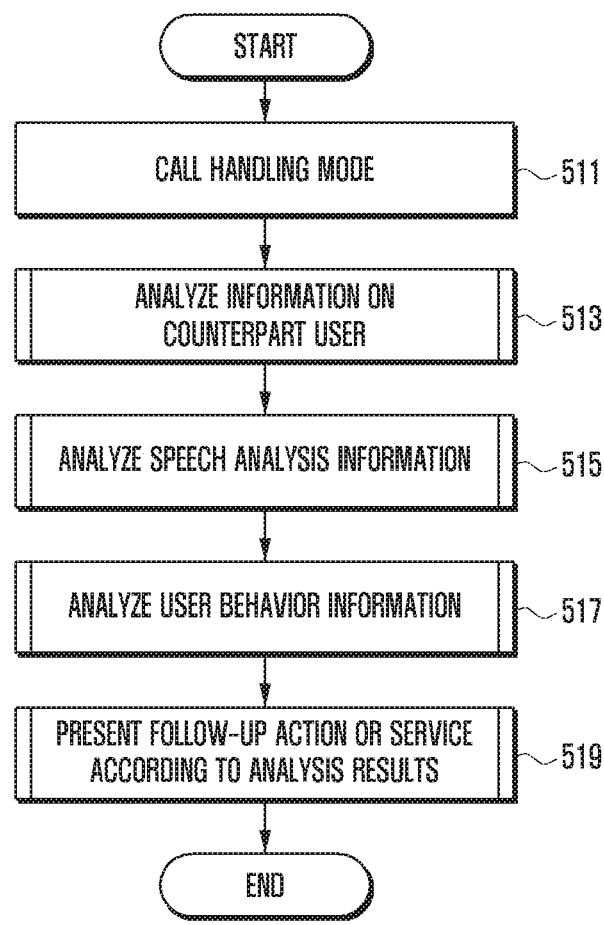
FIG. 5 is a flowchart of a procedure for suggesting a follow-up action in a call performed by a mobile terminal having a control unit with a configuration of FIG. 4 according to an exemplary embodiment of the present invention.

FIG. 5 is a flowchart of a procedure for suggesting a follow-up action in a call performed by the mobile terminal having a control unit with the configuration of FIG. 4 according to an exemplary embodiment of the present invention.

Referring to FIG. 5, the control unit 100 enters into a call handling mode at step 511. In the call handling mode, the control unit 100 analyzes information on the counterpart user of the call at step 513. Here, the control unit 100 may monitors the state of the mobile terminal through the sensing unit 140 to identify a user behavior for which the control unit needs further information during the conversation at step 517.

The counterpart information, speech analysis information and user behavior information collected through steps 513 to 517 may be incomplete in themselves. This incompleteness may be alleviated by combining these pieces of information together. To achieve this, information items collected by each of the speech analyzer 410, counterpart information analyzer 420 and state change analyzer 430 may be scored according to probability. That is, a high score may be assigned to a highly probable item. Each of the analyzers 410, 420 and 430 may assign different scores to multiple information items. The counterpart information, speech analysis information and user behavior information are sent together with assigned scores to the follow-up activity handler 440. The control unit 100 determines a follow-up action on the basis of the counterpart information, speech analysis information and user behavior information, and presents the follow-up action during the call at step 519. A follow-up action is determined using items of the analysis results with scores higher than a threshold.

Figure 6:
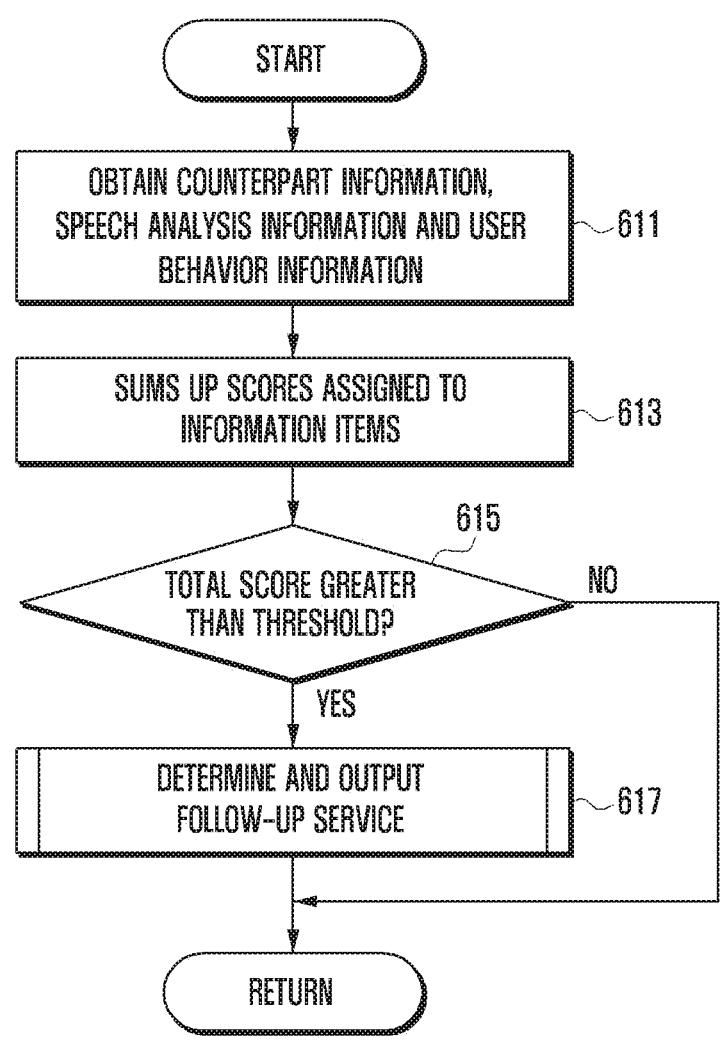
FIG. 6 is a flowchart of a procedure for determining a follow-up action in a call performed by a follow-up activity handler of the control unit using received analysis results according to an exemplary embodiment of the present invention.

FIG. 6 is a flowchart of a procedure for determining a follow-up action in a call performed by the follow-up activity handler of the control unit using received analysis results according to an exemplary embodiment of the present invention.

Referring to FIG. 6, the control unit 100 obtains counterpart information, speech analysis information and user behavior information through the speech analyzer 410, counterpart information analyzer 420 and state change analyzer 430 at step 611. Here, items of the analysis results are scored by the corresponding analyzers 410 to 430. The control unit 100 extracts a list of probable activities on the basis of the obtained information, and sums up the scores assigned to information items associated with the probable activities at step 613. The control unit 100 checks whether the total score for one probable activity is greater than a preset threshold at step 615. When the total score for one probable activity is greater than the preset threshold, the control unit 100 determines the probable activity to be a follow-up action (service or function) and outputs the follow-up action to the display unit 130 during the call at step 617.

Figure 7A:
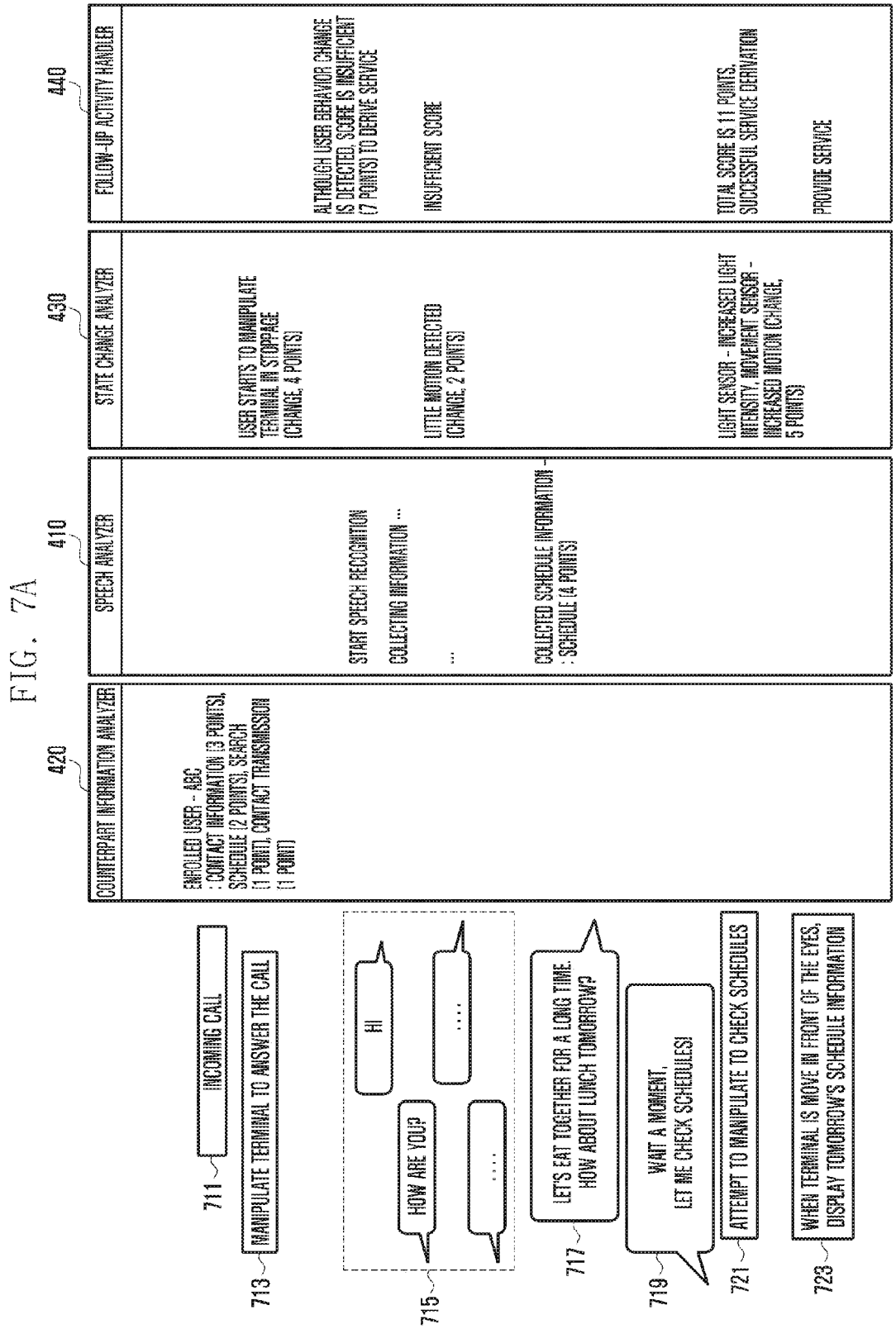
FIGS. 7A and 7B illustrate activation of a scheduling function during a call according to an exemplary embodiment of the present invention.
Figure 7B:
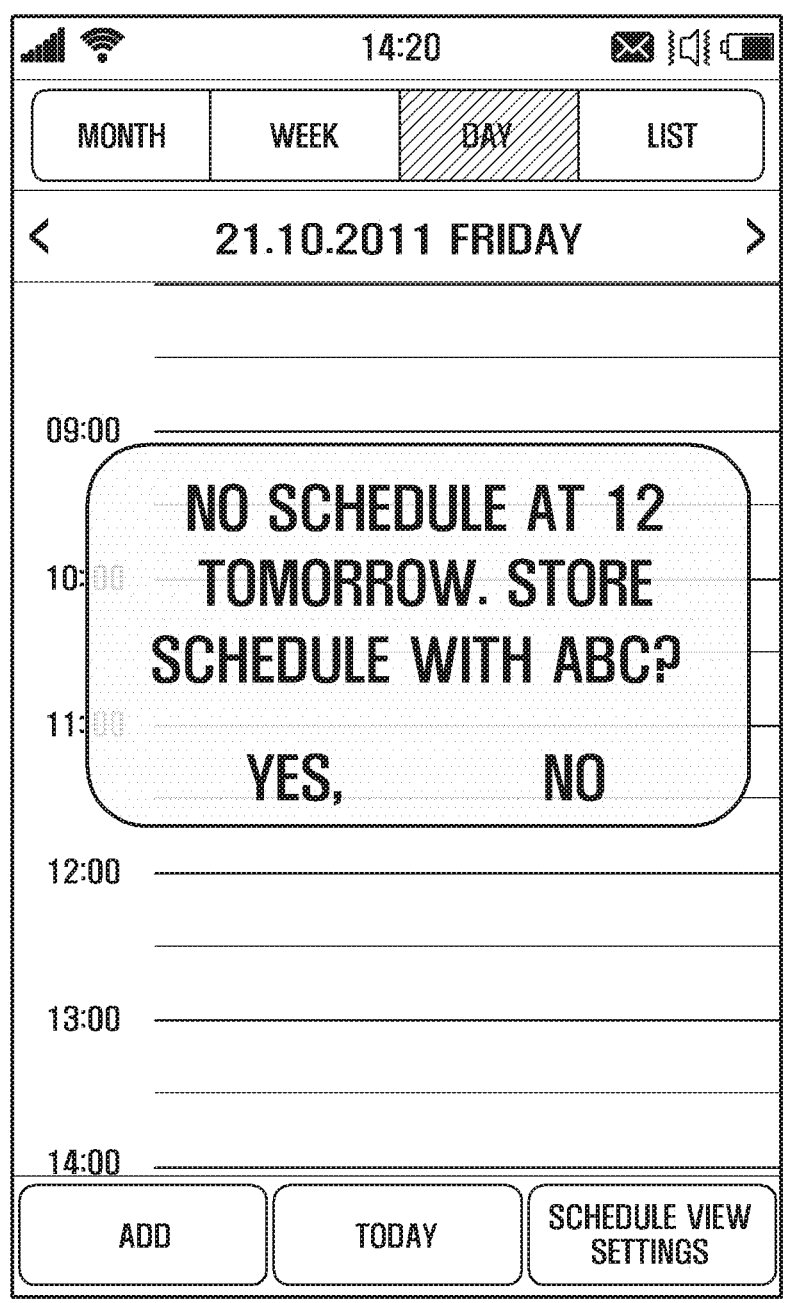

FIGS. 7A and 7B illustrate activation of a scheduling function during a call according to an exemplary embodiment of the present invention.

Referring to FIG. 7A, when an incoming call is received at step 711, the control unit 100 notifies call reception. When the call is answered by the user at step 713, the control unit 100 relays a phone conversation between the user and the counterpart user at step 715. Upon call reception, the counterpart information analyzer 420 may check whether the phone number of the call is enrolled in the mobile terminal. When the phone number is enrolled, the counterpart information analyzer 420 examines the frequency of calls or communications with the counterpart user and assigns a corresponding score to the counterpart information. During the call, the speech analyzer 410 performs speech recognition to analyze the phone conversation between the user and counterpart user. When the counterpart user talks about a schedule event with a given date at step 717, the speech analyzer 410 generates corresponding date information. In addition, the user may move the mobile terminal from the ear to the eye and may manipulate the mobile terminal to check planned schedules at steps 719 and 721. Here, the state change analyzer 430 generates user behavior information on the basis of an output of the sensing unit 140. A user behavior may be detected through sensors of the sensing unit 140, such as an ambient light sensor, and movement sensor (e.g., an acceleration sensor, a geomagnetic sensor, a gyro sensor, and the like).

After the generation of counterpart information (i.e., regarding an enrolled counterpart user), speech analysis information (e.g., including date information) and user behavior information, the follow-up activity handler 440 determines a follow-up action by combining these pieces of information and outputting the follow-up action to the display unit 150 at step 723. For example, when the date information is for tomorrow's lunch appointment, the control unit 100 may search schedule items stored in the memory unit 110 for noon tomorrow and display the search result on the display unit 150 as shown in FIG. 7B. That is, when a schedule event with a desired date and hour is detected in the phone conversation, the control unit 100 may check existing planned schedule items with the date and hour, and display the checked result as a follow-up action for the user.

In FIG. 7A, the counterpart user has proposed tomorrow's lunch appointment during the phone conversation, thereby generating date information. Then, the control unit 100 predicts a follow-up action of schedule checking on the basis of speech recognition results, and invokes a scheduling program for the user immediately after the user moves the mobile terminal to another position. More specifically, the control unit 100 analyzes the conversation through speech recognition. When the counterpart user proposes an appointment with a specific date, the control unit 100 predicts a follow-up action of schedule checking. At the same time, the control unit 100 determines that the phone number of the call is enrolled in the mobile terminal (i.e., an enrolled counterpart user) and examines the frequency of calls, appointments or communications with the counterpart user. When the user moves the mobile terminal to another position to check existing schedules (e.g., the mobile terminal is moved from a position close to the ear to a position in front of the eyes), the control unit 100 detects movement of the mobile terminal (i.e., user behavior) through the sensing unit 140. The control unit 100 may interpret this user behavior as a request for scheduling checking, and may invoke a scheduling program as shown in FIG. 7B, thereby shortening schedule search time. Hence, the control unit 100 may present a follow-up action in advance during a call.

Figure 8A:
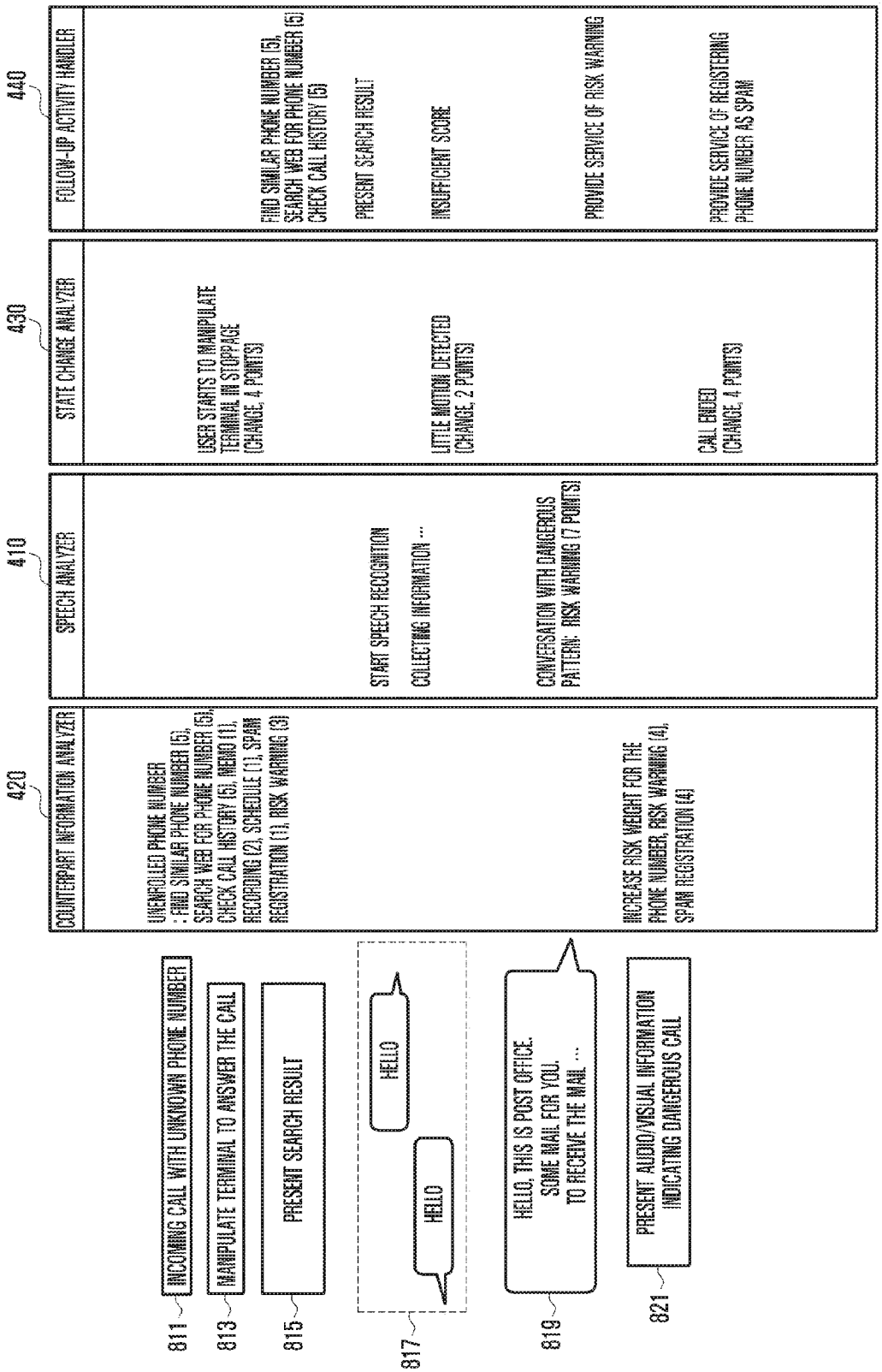
FIGS. 8A and 8B illustrate activation of a phishing alert function during a call according to an exemplary embodiment of the present invention.
Figure 8B:
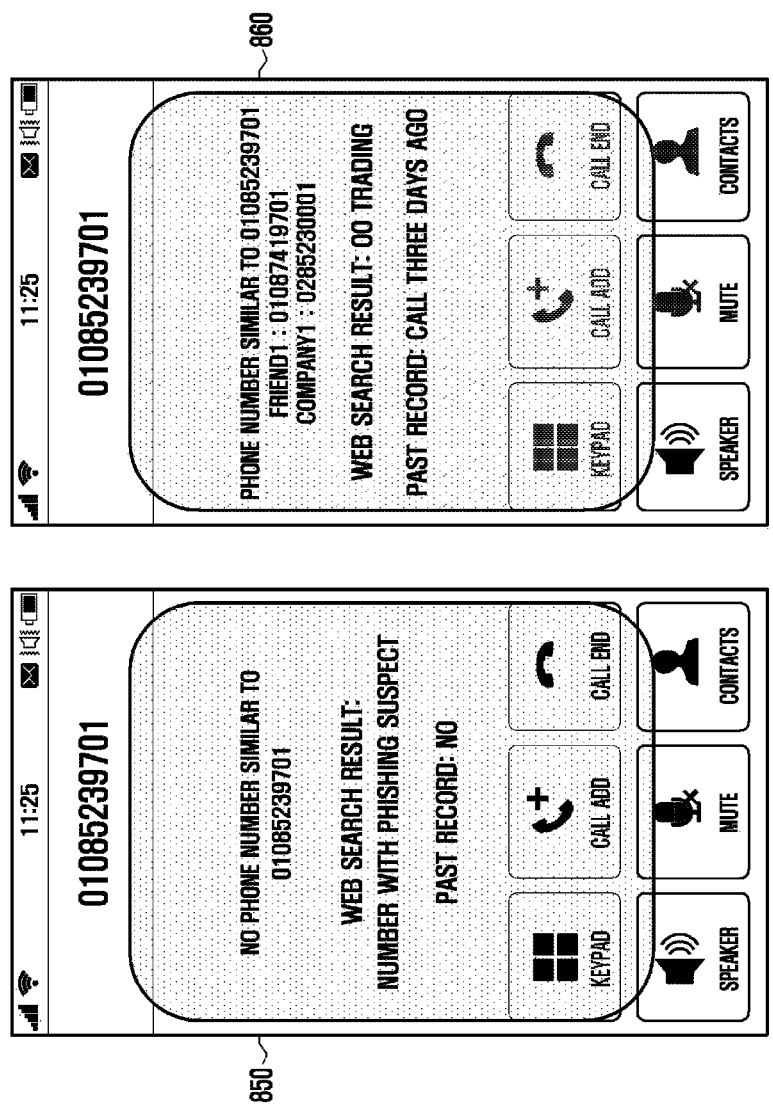

FIGS. 8A and 8B illustrate activation of a phishing alert function during a call according to an exemplary embodiment of the present invention.

Referring to FIG. 8A, when a call with an unknown phone number is received at step 811, the control unit 100 displays a call reception indication. Upon call reception at step 813, the counterpart information analyzer 420 may determine that the phone number is an unenrolled number, search information on the phone number on the Internet through the communication unit 120, and display the search result at step 815. The counterpart information analyzer 420 may examine the call or communication history to check whether the phone number is registered as spam. When the call is answered by the user, the control unit 100 relays a phone conversation between the user and the counterpart user at step 817. During the call, the speech analyzer 410 performs speech recognition to analyze the phone conversation between the user and counterpart user. When the counterpart user speaks phishing-pattern words at step 819, the speech analyzer 410 generates a phishing risk indication as speech analysis information. In addition, the user may move the mobile terminal from a position close to the ear to a position in front of the eyes in order to check a phishing attempt, and the state change analyzer 430 may generate corresponding user behavior information on the basis of an output of the sensing unit 140.

After generating counterpart information (e.g., related to an unenrolled counterpart user), speech analysis information (e.g., a phishing risk indication) and user behavior information, the follow-up activity handler 440 determines a follow-up action by combining these pieces of information and outputting the follow-up action to the display unit 150 at step 821. When speech analysis information indicates a phishing risk, the control unit 100 may output a phishing alert message to the display unit 150 as indicated by reference numeral 850 of FIG. 8B. That is, when the counterpart user speaks phishing-pattern words, the control unit 100 may output a phishing alert message in advance as a follow-up action.

When the phone number of the call is not enrolled, the control unit 100 may search a stored phonebook for a similar phone number. When the phone conversation is unrelated to a phishing pattern, the control unit 100 may output similar phone numbers and associated call records as a follow-up service, as indicated by reference numeral 860 of FIG. 8B. For example, a corporation may use many similar phone numbers, and the same corporate member may place a call with similar but different phone numbers. To handle this case, when the phone number of a call is similar to an enrolled phone number, the control unit 100 may output similar phone numbers as a follow-up action for call reception, as indicated by reference numeral 860 of FIG. 8B.

Figure 9B:

FIGS. 9A and 9B illustrate activation of a follow-up action in an ARS call according to an exemplary embodiment of the present invention.

Referring to FIG. 9A, when a call is placed at step 911, the control unit 100 notifies of the call generation. When the user responds to the call, the control unit 100 provides a call service at step 913. Upon call generation, the counterpart information analyzer 420 may check whether the call is an ARS call. As ARS phone numbers have a different format, the counterpart information analyzer 420 may distinguish an ARS phone number from a regular phone number. During the call, the control unit 100 performs speech recognition to analyze whether the phone conversation has an ARS pattern at step 915. The follow-up activity handler 440 may then identify the call as an ARS call, and may present a follow-up action for the ARS call on the basis of analysis information from the speech analyzer 410 and from the counterpart information analyzer 420. In the case of an ARS call, the control unit 100 may output a keypad for entering alphanumeric information as a follow-up action in response to a request of the counselor as shown in FIG. 9B. That is, the control unit 100 may output a keypad for entering alphanumeric information requested by the counselor as a follow-up action for ARS call connection. Thereafter, the control unit 100 may enter requested information through the keypad and may continue to relay conversation in the ARS call.

As described above, in the case of an ARS call, an ARS phone number has a format different from that of a regular phone number, and has a unique conversation pattern (e.g., "Hello. This is XX customer service center. Please enter a desired service number."). Here, the counterpart information analyzer 420 sends an ARS call indication as counterpart information to the follow-up activity handler 440. During the call (the user does not talk while the counterpart user speaks a request for entering a desired service number), the speech analyzer 410 sends an ARS pattern indication as speech analysis information to the follow-up activity handler 440. When the user moves the mobile terminal from a position close to the ear to a position before the eye to enter a desired number, the state change analyzer 430 sends corresponding user behavior information to the follow-up activity handler 440. Then, the follow-up activity handler 440 identifies a user's need for entering a desired number and outputs a keypad to the display unit 150 as a follow-up action as shown in FIG. 9B on the basis of ARS call indication and movement of the mobile terminal before the eye sensed by the sensing unit 140.

In another exemplary embodiment, when, e.g., the user receives legal advice, the mobile terminal may automatically record the conversation as a follow-up action or service. More specifically, when the phone number of the counterpart user has a recording indication or is discovered as being a phone number of a legal service provider through Internet browsing, the counterpart information analyzer 420 sends a recording indication as counterpart information to the follow-up activity handler 440. When the conversation includes legal words, the counterpart information analyzer 420 sends a legal issue indication as speech analysis information to the follow-up activity handler 440. Thereafter, the follow-up activity handler 440 may determine that the conversation is related to a legal matter, and may be important for the user, and thus may record the conversation as a follow-up action. When the call is ended, the follow-up activity handler 440 may notify the user of the recording and request the user to confirm whether to store the recorded results.

In exemplary embodiments of the present invention, a mobile terminal can predict a user action and can execute an application supporting the predicted user action in advance, during an ongoing call, on the basis of the phone conversation, counterpart information and/or the state of the mobile terminal. Hence, the user of the mobile terminal does not have to directly invoke a different function during a call, and may pay more attention to the ongoing conversation. Consequently, the present invention can improve user experience by suggesting an action desired by the user in advance.

While the invention has been shown and described with reference to certain exemplary embodiments thereof, it will be understood by those skilled in the art that various changes in form and details may be made therein without departing from the spirit and scope of the present invention as defined in the appended claims and their equivalents.

What is claimed is:

1. An electronic device comprising:
a display;
a transceiver; and
at least one processor operatively coupled to the display and the transceiver, the at least one processor configured to:
receive a call request;
control the transceiver to establish a call connection in response to the call request,
determining whether a counterpart associated with the call connection corresponds to a specified counterpart, and
while the call connection is established and in response to determining that the counterpart associated with the call connection corresponds to the specified counterpart, control the display to display a keypad in relation with the call connection.

2. The electronic device of claim 1, wherein the at least one processor is further configured to control the display to display the keypad in response to a specified movement of the electronic device being detected during the call connection.

3. The electronic device of claim 2, wherein the specified movement of the electronic device is caused by a preset gesture of a user.

4. The electronic device of claim 2, wherein the specified movement of the electronic device is caused by a natural action of a user.

5. The electronic device of claim 2, wherein the specified movement of the electronic device is a movement of the electronic device away from a position close to a body of a user.

6. The electronic device of claim 1, wherein the specified counterpart is associated with an automatic response service (ARS).

7. The electronic device of claim 1, wherein the specified counterpart is identified based on a phone number associated with the call connection.

8. A mobile communication device comprising:
   a display;
   a transceiver; and
   at least one processor operatively coupled to the display and the transceiver, the at least one processor configured to:
   receive a call request;
   control the transceiver to establish a call connection in response to the call request,
   during the call connection, detect whether there is a specified movement of the mobile communication device, the specified movement of the mobile communication device being independent of the geographic location of the mobile communication device, and
   control the display to display a keypad in response to the specified movement of the mobile communication device being detected during the call connection.

9. The mobile communication device of claim 8, wherein the specified movement of the mobile communication device is caused by a preset gesture of a user.

10. The mobile communication device of claim 8, wherein the specified movement of the mobile communication device is caused by a natural action of a user moving the mobile communication device to view the display.

11. The mobile communication device of claim 8, wherein the specified movement of the mobile communication device is a movement of the mobile communication device away from a position close to a body of a user.

* * * * *